United States Patent [19]

Yoshida et al.

[11] Patent Number: 4,723,461
[45] Date of Patent: Feb. 9, 1988

[54] TILTABLE STEERING COLUMN WITH COUPLING MEANS PROVIDED BETWEEN TWO COAXIAL TILT MECHANISM PAWL RELEASE MEANS

[75] Inventors: Moritaka Yoshida; Seitaro Shibasaki, both of Toyota, Japan

[73] Assignee: Toyota Jidosha Kabushiki Kaisha, Japan

[21] Appl. No.: 870,740

[22] Filed: Jun. 4, 1986

[30] Foreign Application Priority Data

Jun. 25, 1985 [JP] Japan ................................. 60-96197

[51] Int. Cl.$^4$ .............................................. B62D 1/18
[52] U.S. Cl. ...................................... 74/493; 74/522; 74/540; 74/571 M; 74/577 M
[58] Field of Search .................. 74/493, 540, 577 M, 74/571 M, 522; 280/775; 297/369, 379

[56] References Cited

U.S. PATENT DOCUMENTS

| | | | |
|---|---|---|---|
| 2,188,635 | 1/1940 | Van Dusen, Jr. | 74/522 X |
| 3,058,148 | 10/1962 | Beierbach et al. | 297/369 |
| 3,302,478 | 2/1967 | Pauwels | 74/493 |
| 3,628,396 | 12/1971 | Grobowski | 74/493 |
| 4,084,449 | 4/1978 | Kine | 74/522 X |
| 4,530,254 | 7/1985 | Toyoda et al. | 74/540 |
| 4,538,478 | 9/1985 | Sato et al. | 74/540 X |
| 4,541,672 | 9/1985 | Fukuta et al. | 297/379 X |

FOREIGN PATENT DOCUMENTS

| | | |
|---|---|---|
| 57-53730 | 11/1982 | Japan . |
| 58-163354 | 10/1983 | Japan . |
| 61-21671 | 2/1986 | Japan . |
| 1018485 | 1/1966 | United Kingdom ................ 74/493 |
| 703401 | 12/1979 | U.S.S.R. ................................. 74/493 |

Primary Examiner—James T. McCall
Attorney, Agent, or Firm—Parkhurst & Oliff

[57] ABSTRACT

A tiltable steering column for an automotive vehicle includes a main steering shaft made up from a lower steering shaft and an upper steering shaft tiltably rotationally connected to the lower steering shaft, and a column tube assembly which includes a lower tube which rotatably supports the lower steering shaft from the body of the automotive vehicle and an upper tube which rotatably supports the upper steering shaft and is pivotally mounted so as to be able to tilt relative to the lower tube. A tilt locking mechanism also included in the steering column includes a first side ratchet mechanism on one side of the column tube assembly and a second side ratchet mechanism on the other side of the column tube assembly. Each such side ratchet mechanism includes a ratchet fixedly attached to one of the upper tube and the lower tube, a means which acts constantly for biasing the pawl so as to engage it with the ratchet, and a means for being rotated about an axis for selectively biasing the pawl so as to release its engagement with the ratchet. The axes of rotation of the two pawl releasing means of the first side ratchet mechanism and the second side ratchet mechanism are substantially coincident. And the tilt locking mechanism also includes a means for coupling the operation of the two pawl releasing means together. Thereby, errors in manufacture and assembly can be compensated for, and the construction can easily be accurately assembled, thus assuring good operability and manufacturability of the steering shaft.

3 Claims, 15 Drawing Figures

TILTABLE STEERING COLUMN WITH COUPLING MEANS PROVIDED BETWEEN TWO COAXIAL TILT MECHANISM PAWL RELEASE MEANS

BACKGROUND OF THE INVENTION

The present invention relates to a tiltable steering column for an automotive vehicle, and more particularly relates to such a tiltable steering column for an automotive vehicle, which is suitable for being adjusted so as to conform the driving position to the particular physical build and preference of an individual driver, which is improved in terms of fittability and assemblability.

Generally, as an overall construction, a tiltable steering column for an automotive vehicle comprises a main steering shaft comprising a lower steering shaft and an upper steering shaft tiltably rotationally connected to said lower steering shaft, and a column tube assembly, comprising a lower tube which rotatably supports said lower steering shaft from the body of said automotive vehicle, and an upper tube which rotatably supports said upper steering shaft and is pivotally mounted so as to be able to tilt relative to said lower tube. Further, it is pe se known for such a tiltable steering column for an automotive vehicle to comprise a tilt locking mechanism which comprises a ratchet mechanism comprising: a ratchet fixedly attached to one of said upper tube and said lower tube; a pawl pivotally attached to the other of said upper tube and said lower tube; a means for biasing said pawl so as to engage it with said ratchet, which acts constantly; and a means for selectively biasing said pawl so as to release its said engagement with said ratchet. Thereby, by operating the releasing means for the pawl, the engagement of the pawl to the ratchet is released, and the upper tube can be rotatably tilted with respect to the lower tube, thus enabling the position of the steering wheel, which is fixed to the upper end of the upper steering shaft, to be adjusted so as to conform the driving position to the particular physical build and preference of an individual driver.

According to such a tiltable type steering column, for instance the ones disclosed in Japanese Utility Model Publication Serial No. 57-53730 (1982) and Japanese Utility Model Laying Open Publication Ser. No. 58-163354 (1983), neither of which is it intended to admit as prior art to the present application except to the extent otherwise required by law, the upper tube is rotationally locked with respect to the lower tube and thus the vehicle body by the tilt locking mechanism; but, since the tilt locking mechanism is in principle provided only on one side of the steering column assembly, the lateral support rigidity for the upper tube is not always sufficient, and good vibrational characteristics cannot be assured in all cases. And, in the worst case, sideways skewing of the steering wheel could in principle occur.

In view of these problems, the present applicant, in Japanese Utility Model Applicatin Ser. No. 59-106772, which again it is not intended hereby to admit as prior art to the present application except to the extent otherwise required by law, has proposed a tiltable steering column in which two such tilt locking mechanisms are located one on each side of the steering column; and the two release levers of these two tilt locking mechanisms are synchronized by way of a connecting shaft. Further, attention is drawn to U.S. patent applications Ser. Nos. 811,289 and 870,754 which, again, it is not intended hereby to admit as prior art to the present application except to the extent otherwise required by law.

As a result of this arrangement, in such a tilt steering device, since the upper tube of the steering column is supported by a pair of tilt locking mechanisms arranged on both sides of the steering column, the lateral rigidity of the support of the upper tube can be increased, and good vibrational characteristics can be obtained, with the additional advantage that, since the release levers of the two tilt locking mechanisms are synchronized, the rotational operation of only one of the release levers is required for releasing the locking action of the two tilt locking mechanisms, and accordingly the operability of the device is quite good.

The problem however arises that, since the two sides of the upper and lower tubes are individually locked together by the two tilt locking mechanisms, the accuracy of fitting of these mechanisms is crucial. Specifically, a slight difference in the phases of the teeth of the two ratchets, or other divergence from the ideal due to manufacturing variations of the parts, can prevent the proper engagement of one of the two tilt locking mechanisms, and it is extremely difficult to properly ensure simultaneous meshing of the two pawls with the two ratchets, because of the inevitability of dimensional variations of the parts during manufacture, as well as because of the inevitability of assembly variations of the steering column structure. Also, it is difficult to provide a simple structure for coupling the two release levers for the two ratchet mechanisms together in proper mutual relative positioning.

SUMMARY OF THE INVENTION

Accordingly, it is the primary object of the present invention to provide a tiltable steering column, which avoids the above described problems.

It is a further object of the present invention to provide such a tiltable steering column, which provides good stability for the support of the upper tube member thereof and for the steering wheel.

It is a further object of the present invention to provide such a tiltable steering column, which is not prone to any sideways skewing of the steering wheel.

It is a yet further object of the present invention to provide such a tiltable steering column, which has two such tilt locking mechanisms on either side of the steering column, and which is not prone to difficulties with proper simultaneous engagement of said tilt locking mechanisms.

It is a yet further object of the present invention to provide such a tiltable steering column, which has two such tilt locking mechanisms on either side of the steering column, and in which said two tilt locking mechanisms can both reliably be simultaneously engaged or disengaged.

It is a yet further object of the present invention to provide such a tiltable steering column, the operation of which does not suffer unduly due to moderate deviances from manufacturing or assembly specifications.

It is a yet further object of the present invention to provide such a tiltable steering column, which has good vibrational characteristics.

It is a yet further object of the present invention to provide such a tiltable steering column, which has good assemblability.

It is a yet further object of the present invention to provide such a tiltable steering column, which has a simple structure for coupling two release levers for two ratchet mechanisms thereof together in proper mutual relative positioning.

According to the most general aspect of the present invention, these and other objects are accomplished by a tiltable steering column for an automotive vehicle, comprising: (a) a main steering shaft comprising a lower steering shaft and an upper steering shaft rotatably connected to said lower steering shaft; (b) a column tube assembly, comprising: (b1) a lower tube which rotatably supports said lower steering shaft from the body of said automotive vehicle; and (b2) an upper tube which rotatably supports said upper steering shaft and is pivotally mounted so as to be able to tilt relative to said lower tube at least in a substantially vertical plane; and: (c) a tilt locking mechanism, comprising a first side ratchet mechanism on one side of said column tube assembly and a second side ratchet mechanism on the other side of said column tube assembly, each said side ratchet mechanism comprising: (c1) a ratchet fixedly attached to one of said upper tube and said lower tube; (c2) a pawl pivotally attached to the other of said upper tube and said lower tube; (c3) a means for biasing said pawl so as to engage it with said ratchet, which acts constantly; and: (c4) a means for being rotated about an axis for selectively biasing said pawl so as to release its said engagement with said ratchet; (c5) said axes of rotation of said two pawl releasing means of said first side ratchet mechanism and said second side ratchet mechanism being substantially coincident; and further comprising: (d) a means for coupling the operation of said two pawl releasing means together.

According to the present invention as described above, since the side ratchet mechanisms can first be fitted separately on the two sides of the steering column assembly, and then simultaneously the coupling together of the side ratchet mechanisms by the coupling means can be performed afterwards, the problem of matching together the engagement of said two side ratchet mechanisms is essentially solved, and mismatching of the phases of the pawls to the teeth of the ratchets can be easily compensated for without causing any operational problems. Hence, there is provided a tiltable steering column which overcomes the problems outlined above with respect to other constructions, and which provides good stability for the support of the upper tube member thereof and for the steering wheel, as well as not being prone to any sideways skewing of the steering wheel. Further, this tiltable steering column has two tilt locking mechanisms on either side of the steering column, and yet is not prone to difficulties with proper simultaneous engagement of said tilt locking mechanisms, and does not suffer unduly due to moderate deviances from manufacturing or assembly specifications. Thus, this tiltable steering column has good assemblability and good vibrational characteristics.

BRIEF DESCRIPTION OF THE DRAWINGS

The present invention will now be shown and described with regard to certain of the preferred embodiments thereof, and with reference to the illustrative drawings, which however should not be considered as limitative of the present invention in any way, since the scope of the present invention is to be considered as being delimited solely by the accompanying claims, rather than by any particular features of the disclosed embodiments or of the drawings. In these drawings:

DESCRIPTION OF THE PREFERRED EMBODIMENTS

Figure 1:
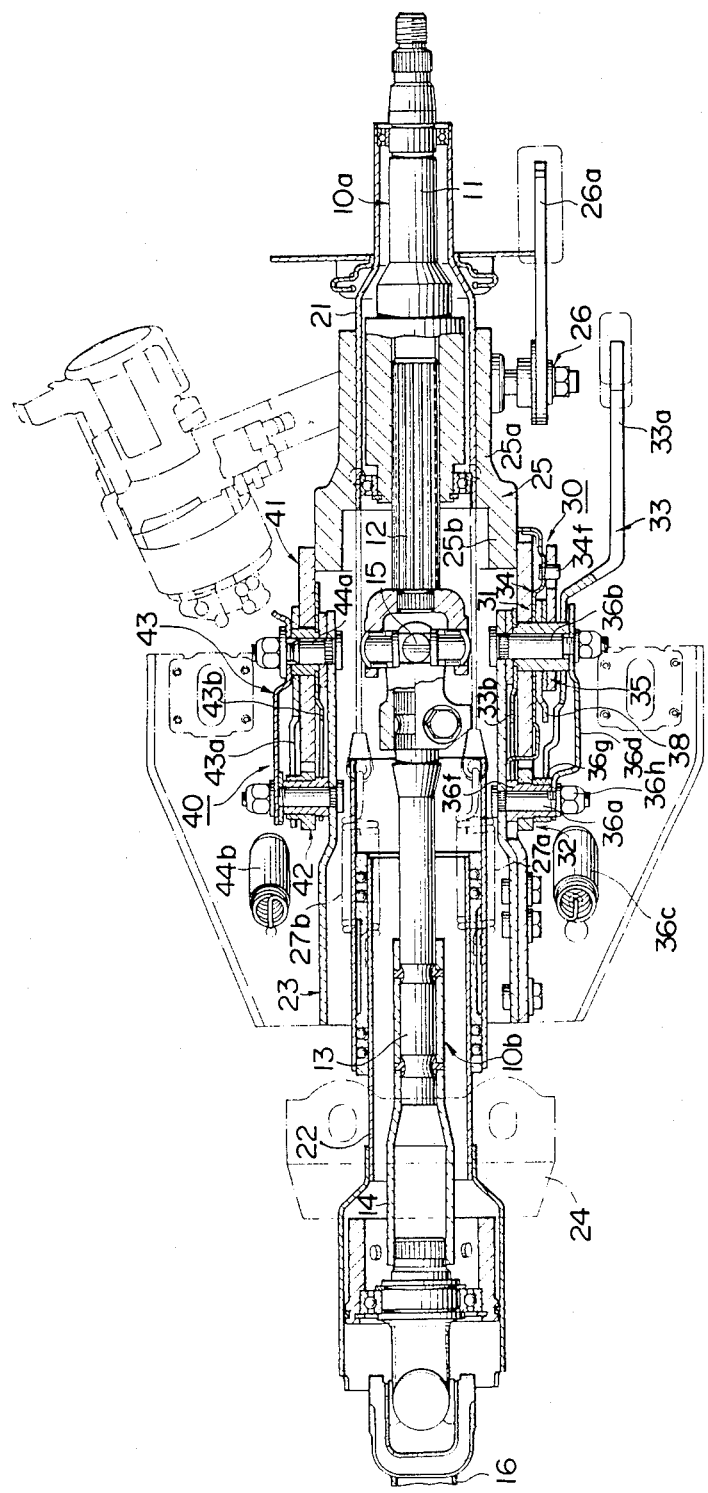
FIG. 1 is a partly schematic sectional view of the first preferred embodiment of the tilt steering column assembly of the present invention taken in a sectional plane containing the longitudinal axis of said column assembly (which is shown as extended substantially straight) and parallel to the transverse axis of the vehicle to which said column assembly is fitted.
Figure 2:
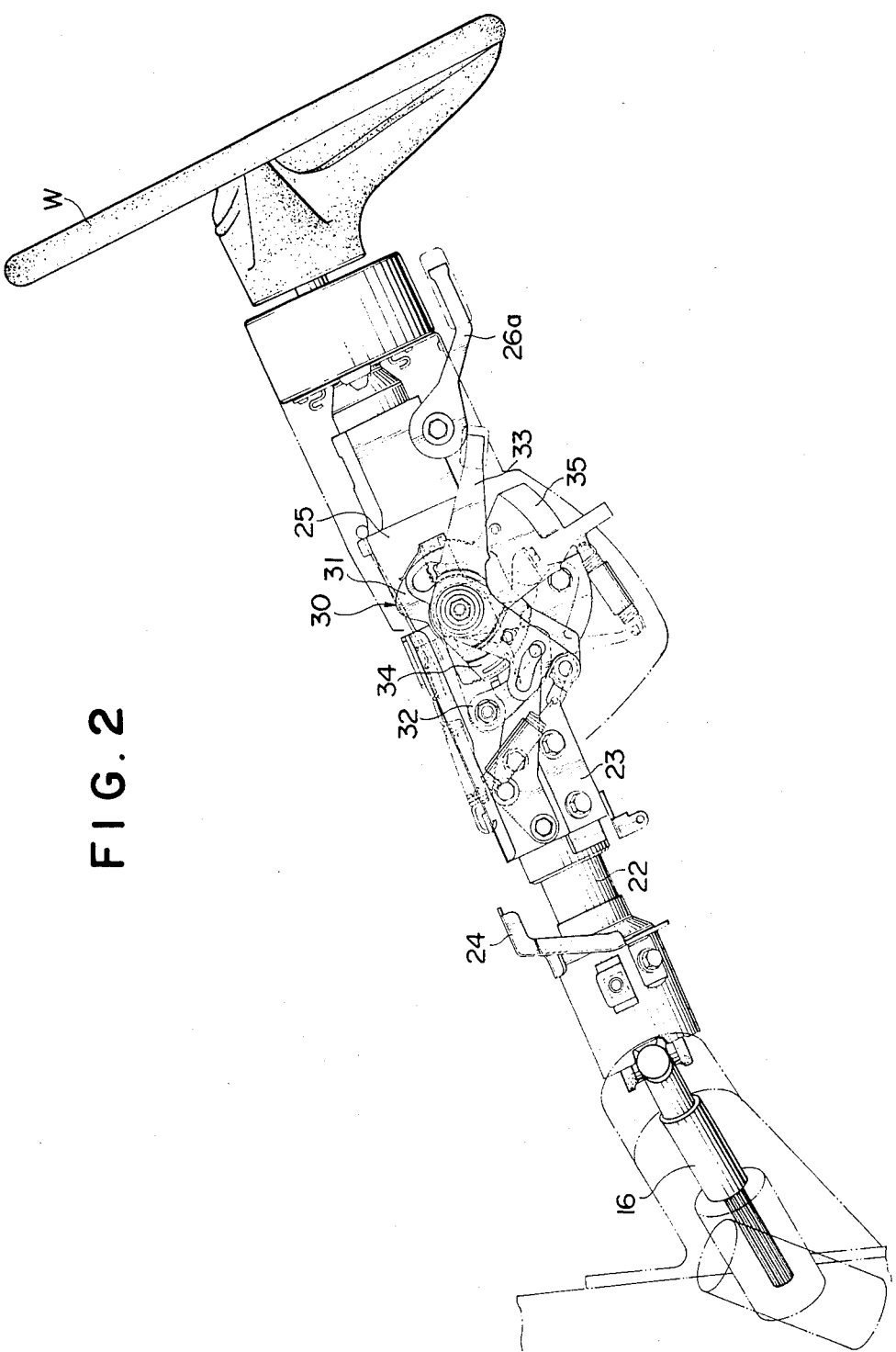
FIG. 2 is a side view of said first preferred embodiment tilt steering column assembly, shown in its state of being mounted to a vehicle body.
Figure 3:
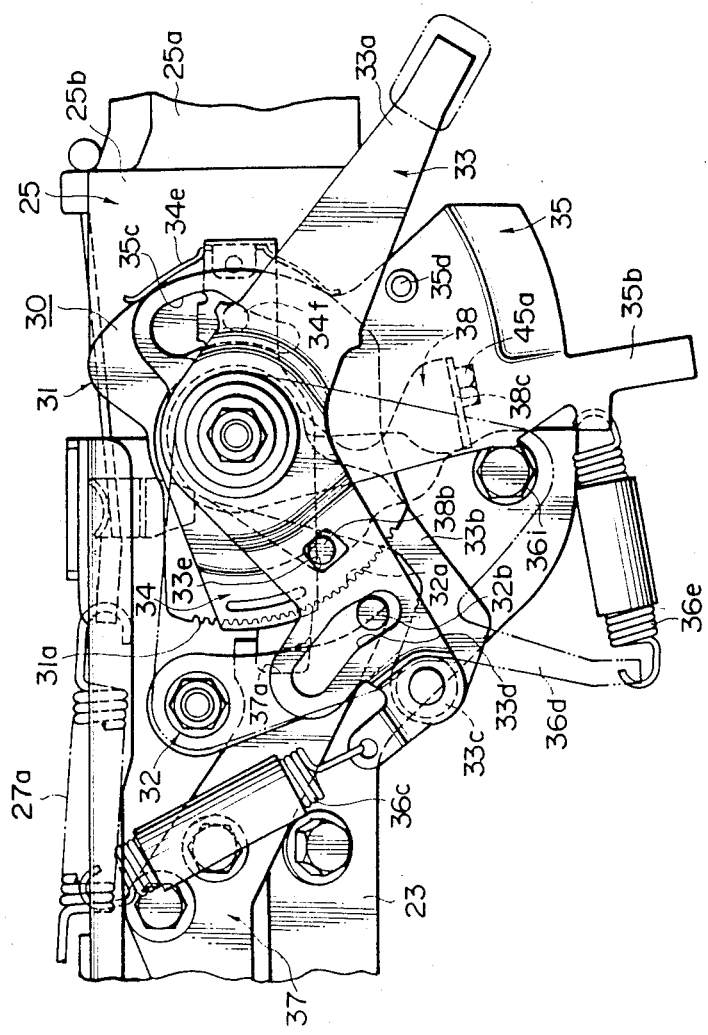
FIG. 3 is a side view of a first tilt locking mechanism shown in FIG. 1, shown at a magnified scale and at one stage of its operation.

The present invention will now be described with reference to the preferred embodiments thereof. FIG. 1 is a longitudinal sectional view of the first preferred embodiment of the tilt steering column assembly of the present invention taken in as near a horizontal sectional plane as possible containing the longitudinal axis of said column assembly, and FIG. 3 is a side view of said tilt steering column assembly shown in its state of being mounted to a vehicle body. In these figures, the reference numeral 10a denotes an upper steering shaft assembly, which is made up from a first shaft 11 and a second shaft 12; and similarly the reference numeral 10b denotes a lower steering shaft assembly, which is made up from a third shaft 13 and a fourth shaft 14. In said upper steering shaft assembly 10a, said first shaft 11 is rotationally coupled to said second shaft 12 but is left free to move axially with respect thereto, by a male splined portion on the right end in FIG. 1 of said second shaft 12 being fitted engagingly with a female splined portion formed on the left end in FIG. 1 of said first shaft 11. On the other hand, in said lower steering shaft assembly 10b, said third shaft 13 is coupled to said fourth shaft 14 both with regard to relative rotational movement therebetween and with regard to relative axial movement therebetween, by a portion on the right hand end in FIG. 1 of said fourth shaft 14 being fitted over and being fixedly coupled to a portion formed on the left end in FIG. 1 of said third shaft 13, said coupling being quite weak so as to allow for collapse of the steering column assembly in an impact situation. And the left end in FIG. 1 of the second shaft 12 is coupled to the right end in said figure of the third shaft 13 by a universal joint 15 of a per se known sort, thus rotationally coupling the upper and lower steering shaft assemblies 10a and 10b together while allowing some bending between them; and the left end in the figure of the fourth shaft 14 is connected via a universal joint to a stub shaft 16 which leads to a steering box, not particularly shown, while a steering wheel W, not shown in FIG. 1 but shown in FIG. 2, is mounted on the right end in the figure of the first shaft 11, which is adapted for mountingly receiving it.

A steering column tube assembly is fitted around this steering shaft assembly, said steering column tube assembly comprising an upper tube 21 which rotatably supports the first shaft 11 of the upper shaft assembly 10a via a pair of bearings, and a lower tube 22 which rotatably supports the fourth shaft 14 of the lower shaft assembly 10b by a bearing. The lower tube 22 is fixedly mounted to the vehicle body, hanging below the instrument panel thereof, via a main fixing bracket 23 attached to a higher portion of said lower tube 22 and an auxiliary fixing bracket 24 attached to a lower portion of said lower tube 22.

A tubular portion 25a of a rotatable bracket 25 is slidably fitted over the upper tube 21, and this rotatable bracket 25 is supported, so as to be rotatable around a horizontal axis substantially transverse to the body of the vehicle, by the two sides as seen in FIG. 1 of the main fixing bracket 23. This sliding of the upper tube 21 in the tubular portion 25a of the rotatable bracket 25 is selectively fixable, by the driver of the vehicle operating a lock mechanism 26 by actuating an operating lever 26a. Thus, by the driver actuating said operating lever 26a so as to release the locking of the upper tube 21 to the rotatable bracket 25, the upper tube 21 becomes able to axially slide with respect to said rotatable bracket 25 with the second shaft 12 sliding inside the first shaft 11, thus providing axial adjustment of the steering wheel W and allowing telescopic operation of the steering column as a whole.

Extending between the main fixing bracket 23 and the rotatable bracket 25 there are provided a pair of tension coil springs 27a and 27b, one on each side of the steering column assembly, and these springs 27a and 27b constantly urge said rotatable bracket 25 in the counterclockwise direction in FIGS. 2 through 5, so as to counterbalance the weight of the upper tube 21, the upper steering shaft assembly 10a, the steering wheel W, and so on. Further, a pair of tilt locking mechanisms, denoted as 30 and 40, are provided, one on each side of the steering column assembly, for selectively either locking together the main fixing bracket 23 and the rotatable bracket 25, or releasing said locking together of said main fixing bracket 23 and said rotatable bracket 25 so that they can rotate with respect to one another about said horizontal axis substantially transverse to the body of the vehicle, thus providing tilting adjustment for the steering wheel W and allowing tilting operation as a whole of the steering column.

The first one 30 of these tilt locking mechanisms will now be described, with reference to FIGS. 3 through 5 which show it as a whole and FIGS. 6 through 9 which show certain individual parts of it. This first tilt locking mechanism 30 comprises a ratchet 31, a pawl 32, a first release lever 33, a cover plate 34, and a second release lever 35.

Figure 4:
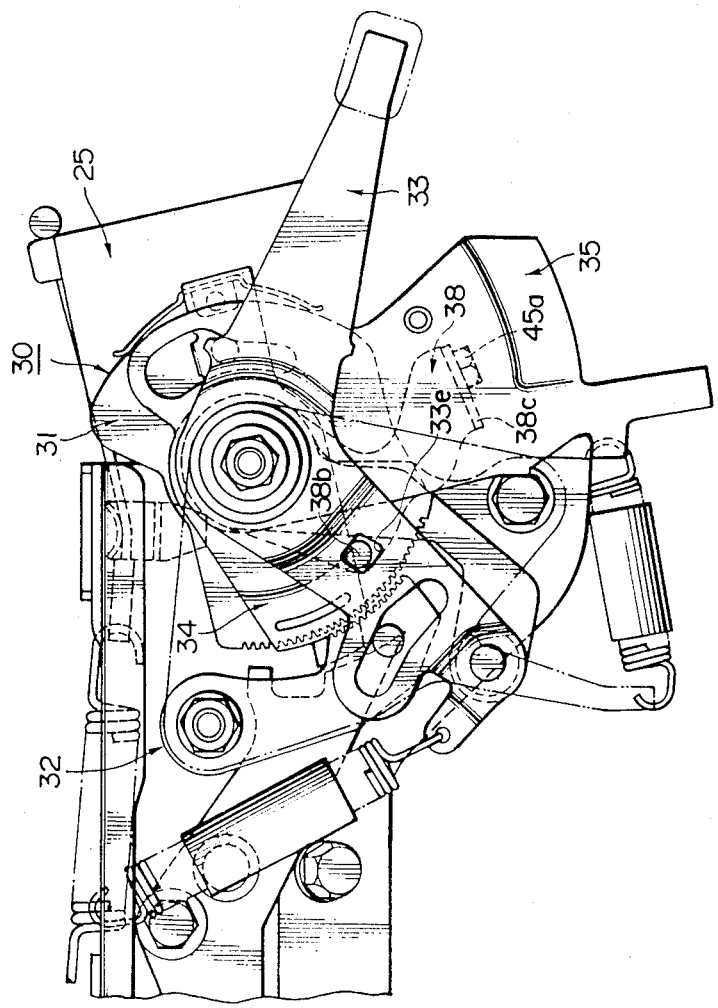
FIG. 4 is a view similar to FIG. 3, showing said first tilt locking mechanism at another stage of its operation.
Figure 5:
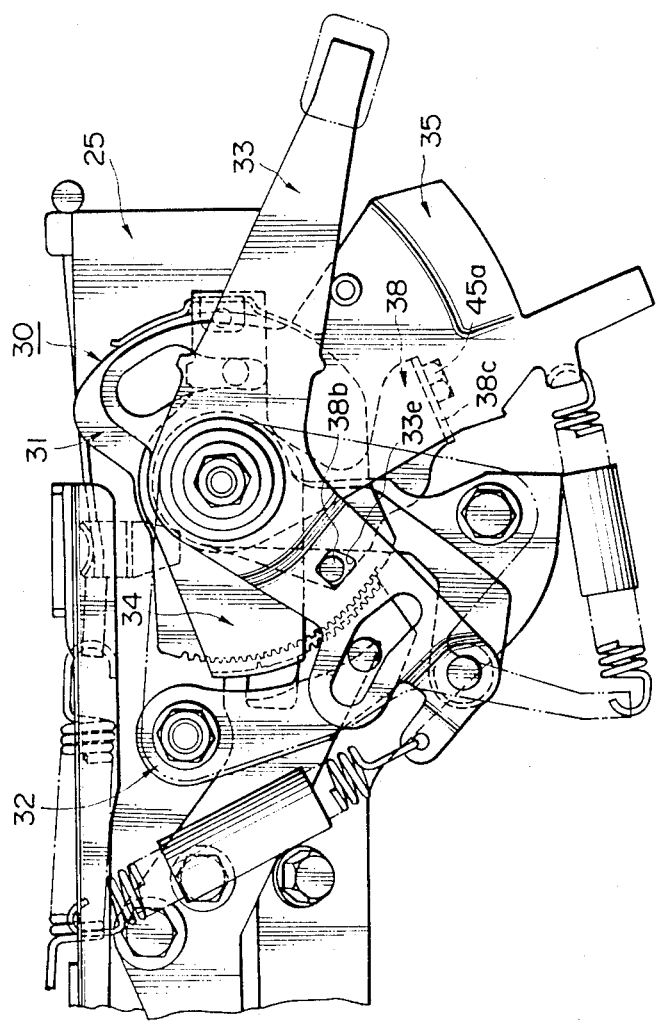
FIG. 5 is a view similar to FIGS. 3 and 4, showing said first tilt locking mechanism at yet another stage of its operation.

To the lower left side as seen in FIGS. 3 through 5 of the rotatable bracket 25 there is fixedly secured the ratchet 31, which is a substantially planar member and functions as a support member for said rotatable bracket 25 and for the steering wheel W and the tiltable portion of the steering column as a whole, by being rotatably fitted over a sleeve provided on a mounting bolt 36b which is fixed to the main fixing bracket 23. Thereby, the aforesaid horizontal axis substantially transverse to the body of the vehicle about which the steering wheel W and the steering column as a whole tilt is defined. An edge portion of this ratchet 31 is formed with a circumferentially extending arcuate toothed portion 31a.

Likewise, the pawl 32 is substantially planar member, and is pivotally mounted to the main fixing bracket 23 by being rotatably fitted over a sleeve provided on another mounting bolt 36a which is likewise fitted to the main fixing bracket 23 and by being retained thereon by a nut 36h; the full details of this fitting construction will be explained hereinafter. And this pawl 32 is formed with an arcuate toothed portion 32a opposed to and confronting the arcuate toothed portion 31a of the ratchet 31. Thereby, when the pawl 32 is rotated about its mounting bolt 36a in the clockwise direction from the point of view of FIGS. 3, 4, and 5, to its position as seen in FIGS. 4 or 5, its arcuate toothed portion 32a is disengaged from the arcuate toothed portion 31a of the ratchet 31, and accordingly the rotation of the steering wheel W and the tiltable portion of the steering column as a whole with respect to the fixed main fixing bracket 23 around the axis defined by the mounting bolt 36b is not substantially impeded thereby; but, on the other hand, when said pawl 32 is rotated in the anticlockwise direction from the point of view of FIGS. 3, 4, and 5 to its position as seen in FIG. 3, then its arcuate toothed portion 32a is engaged to the arcuate toothed portion 31a of the ratchet 31 somewhere along it, and accordingly the rotation of the steering wheel W and of the tiltable portion of the steering column assembly as a whole with respect to the fixed main fixing bracket 23 around said axis defined by the mounting bolt 36b is prevented, and the upper portion of the steering column along with the wheel W are effectively locked into place.

Figure 6:
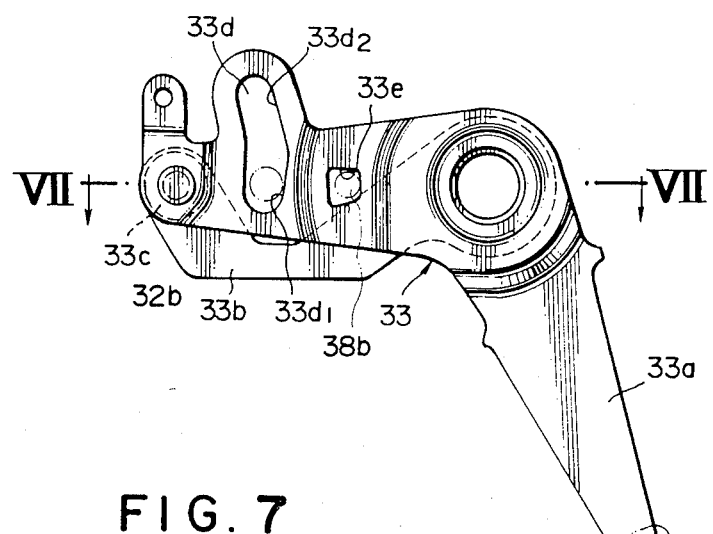
FIG. 6 is a side view of a first release lever, incorporated in the first tilt locking mechanism of FIGS. 3 through 5.
Figure 7:
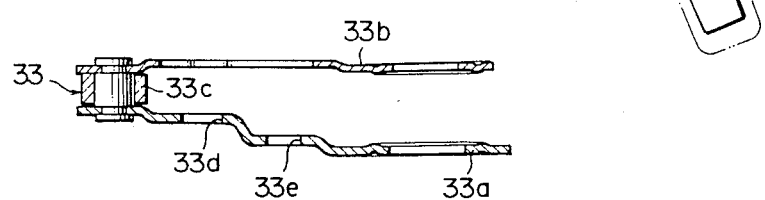
FIG. 7 is a sectional view of said first release lever as taken in a plane shown by the arrows VII—VII in FIG. 6.

For releasing this meshing engagement between the pawl 32 and the ratchet 31 there is provided the first release lever 33, and this is formed of a lever 33a and an auxiliary plate 33b fitted thereto as extending generally parallel thereto; these members can best be seen in FIGS. 6 and 7, which show said first release lever 33 in side view and in sectional view respectively. This lever 33a and auxiliary plate 33b are connected together via the axis of a roller 33c extending between them, and both have apertures, confronting one another, which are fitted over the mounting bolt 36b previously mentioned, so as to mount the first release lever 33 to the main fixing bracket 23 in a rotatable manner around the same transverse horizontal axis for tilting the steering column assembly, previously defined. A cam groove 33d is formed on a portion of the lever 33a, and an engagement pin 32b formed on the pawl 32 is fitted into this cam groove 33d so as to slide therein and so as to be guided thereby. One end of a tension coil spring 36c (see FIG. 3) is fitted to a hole formed in the lever 33a, and the other end of said tension coil spring 36c is hooked to a point on the main fixing bracket 23, and thereby the first release lever 33 is biased in the clockwise direction as seen in FIG. 5, so as (provided the end 33a of said first release lever 33 is not impelled by the and of the driver) to press the roller 33c against the back of the pawl 32 and so as thereby to press said pawl 32 in the anticlockwise direction, so as to urge its toothed portion 32a to be meshed with the toothed portion 31a of the ratchet 31 as seen in FIG. 5.

Figure 8:
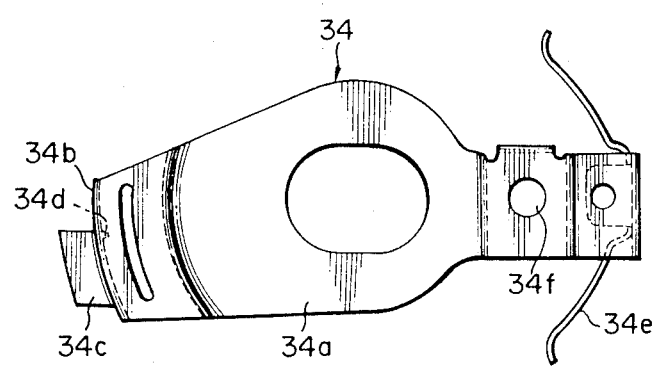
FIG. 8 is a side view of a cover plate incorporated in said first tilt locking mechanisms.

A side view of the cover plate 34 is shown in FIG. 8. This cover plate 34 is used for defining the portion of the toothed shape 31a on the ratchet 31 to which the toothed shape 32a of the pawl 32 engages, i.e. for shielding the portion of said ratchet 31 to which it is not desired that said pawl 32 should engage. The cover plate 34 comprises an arcuate cover portion 34b mounted on the end of a plate portion 34a. The arcuate cover portion 34b has a set of teeth 34d formed on its concave inner surface, and a projection 34c extends outwards from the other side of said cover portion 34b. At the other end of said cover plate 34 there are provided an engagement pin 34f and an arcuately curved sheet spring 34e. This cover plate 34 is fitted over the mounting bolt 36b, on the outside of the ratchet 31, by an elongated hole formed in said cover plate 34. In this state, the sheet spring 34e engages to the back side of the ratchet 31, and the cover plate 34 both is rotatable around the axis of the mounting bolt 36b and is also slidable sideways thereon through a certain distance, either so as to engage the teeth 34d formed on the inside of its arcuate cover portion 34b to a particular contiguous set of the teeth 31a formed on said ratchet 31, or alternatively so as to disengage said teeth 34d and 31a from one another; and the sheet spring 34e biases the cover plate 34 in such a direction as to press said teeth 34d and 31a into mutual engagement. Thereby, the arcuate cover portion 34b serves to blank off a part of the toothed portion 31a of the ratchet 31, leaving that particular covered portion of said ratchet 31 effectively smooth and free from teeth. And, in the above described state wherein said teeth 34d and 31a are moved apart from one another and disengaged, by the pushing of the cover plate 34 in the leftward direction in FIG. 8 against the biasing action of the leaf spring 34e which is overcome, the cover plate 34 can be rotated around the axis of the mounting bolt 36b, so as to change the aforesaid portion of the toothed portion 31a of the ratchet 31 which is blanked off by said cover plate 34.

Figure 9:
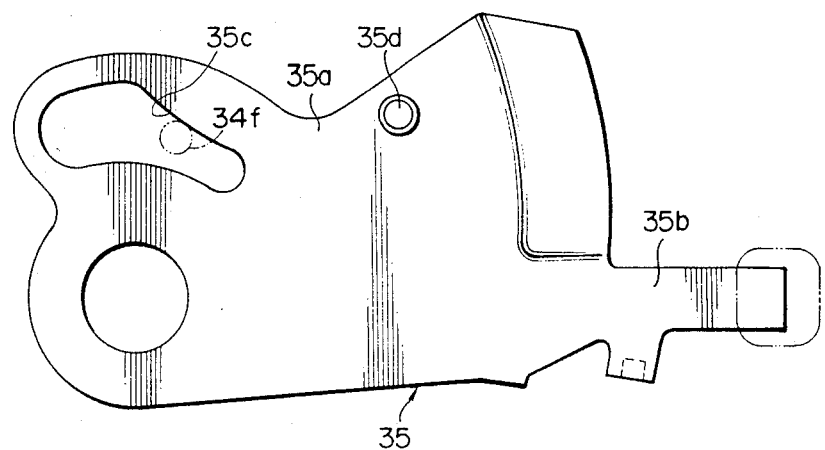
FIG. 9 is a side view of a second release lever incorporated in said first tilt locking mechanism.

In FIG. 9 there is shown in side view the second release lever 35, which is for adjusting the above described mutual meshing position of the cover plate 34 relative to the ratchet 31, by lifting and sliding the cover plate 34. Said second release lever 35 comprises a main plate portion 35a, a lever portion 35b extending therefrom, a cam aperture 35c formed therein, and an engagement pin 35d extending sideways therefrom. And this second release lever 35 is fitted, via a hole formed therein, over the mounting bolt 36b between the first release lever 33 and the cover plate 34. A retainer plate 36d is fitted over the whole assembly, as best seen in FIG. 1, and a tension coil spring 36e is stretched between a projection of said retainer plate 36d and the lever portion 35b of the second release lever 35; thereby, said second release lever 35 is biased in the clockwise direction as seen in FIG. 3, and its clockwise rotation is stopped when a portion of it comes into contact with a bolt 36i fitted to the retainer plate 36d. In this condition, the engagement pin 34f of the cover plate 34 faces and engages with the cam groove 35c of said second release lever 35. A guide plate 37 is assembled to the outside of the fixed bracket 23 and an engagement depression 37a of the guide plate 37 opposes the projection 34c of the cover plate 34, so as to limit the rotation of the cover plate 34 when said cover plate 34 makes a sliding motion and the projection 34c enters into said depression 37a.

Figure 10:
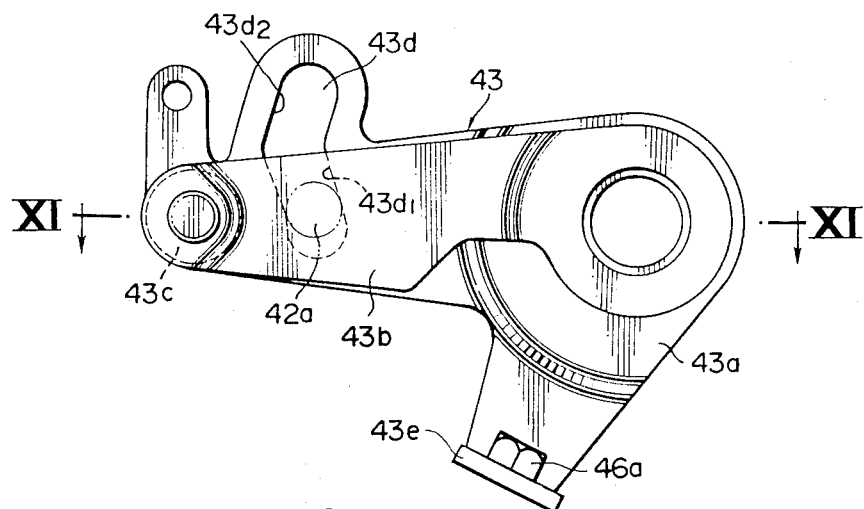
FIG. 10 is a side view of a third release lever incorporated in a second tilt locking mechanism.
Figure 11:
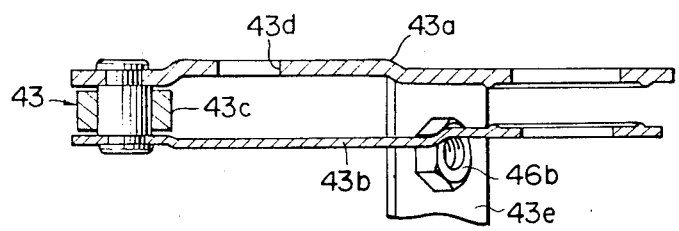
FIG. 11 is a sectional view of said third release lever as taken in a plane shown by the arrows XI—XI in FIG. 10.

The second one of these tilt locking mechanisms will now be described, with particular reference to FIGS. 10 and 11. Said second tilt locking mechanism 40 comprises a ratchet 41, a pawl 42, and a third release lever 43. The ratchet 41 and the pawl 42 are similarly formed and arranged to the ratchet 31 and the pawl 32 of the first tilt locking mechanism 30 described above. The third release lever 43 is for disengaging the meshing of the pawl 42 and the ratchet 41, which are assembled to the main fixing bracket 23 on the other side of its from the first tilt locking mechanism 30 by a mounting bolt 44a and another mounting bolt shown in the figures but not designated by any reference numeral, and comprises a lever member 43a and an auxiliary plate 43b fitted thereto as extending generally parallel thereto; these members can best be seen in FIGS. 10 and 11, which show said release lever 43 in side view and sectional view respectively. Particularly according to a feature of the present inventive concept, the mounting bolt 44a is substantially coaxial with the mounting bolt 36b for the first tilt locking mechanism 30, and like it also serves for pivoting the upper tube 21 to the main fixing bracket 23 so that it is rotatable around the previously defined horizontal tilt axis substantially transverse to the body of the vehicle. The lever 43a and the auxiliary plate 43b of the third release lever 43 are connected together via the axis of a roller 43c extending between them, and both have apertures, confronting one another, which are fitted over the mounting bolt 44a for the ratchet 41 previously mentioned, so as to mount the third release lever 43 to the main fixing bracket 23 in a rotatable manner around the same transverse horizontal tilt axis as previously defined. A cam groove 43d is formed on a portion of the lever 43a, and an engagement pin 42b formed on the pawl 42 is fitted into this cam groove 43d so as to slide therein and so as to be guided thereby. One end of a tension coil spring 44b (see FIG. 3) is fitted to a hole formed in the lever 43a, and the other end of said tension coil spring 44b is hooked to a point on the main fixing bracket 23, and thereby the third release lever 43 is biased in the direction so as (provided the end of the lever 43a is not impelled by the hand of the driver of the vehicle) to press the roller 43c against the back of the pawl 42, so as to press said pawl 42 in the direction to engage its toothed portion with the toothed portion of the ratchet 41.

The particular means by which the pawl 32 of the first tilt locking mechanism 30 is rotatably mounted to the main fixing bracket 23 will now be particularly explained with reference to FIGS. 14 and 15, which are a longitudinal sectional view thereof and a sectional view thereof as taken in a plane shown by the arrows XV—XV in FIG. 14, respectively. In detail, over the previously mentioned bolt 36a, which is fixedly mounted to the main fixing bracket 23 by spline means formed proximate to the head portion of said bolt 36a, there is fitted an eccentric collar 36f which is formed as a tubular eccentric cam with two flats on its end portion. In other words, the middle portion of this collar 36f, over which the cam 32 fits and on which said cam 32 turns, is formed with a cylindrical inner surface and with a cylindrical outer surface which are eccentrically offset from one another by a certain distance L; and the cylindrical inner surface rotatably slides on the outer surface of the mounting bolt 36a, while on the cylindrical outer surface there is rotatably mounted the cam 32. And on the end portion of this collar 36f, over the two flats formed thereon, there is fitted a spacer 36g whose outer surface is formed in a hexagonal shape. The whole construction is retained by the nut 36h fitted onto the end of the mounting bolt 36a. As a result, the rotation of the spacer 36g causes an integral rotation of the eccentric collar 36f, thereby allowing the center of the swinging motion of the pawl 32 to be adjusted within a range of plus L to minus L. The eccentric collar 36f is located between the main fixing bracket 23 and the retainer plate 36d, and is restricted from rotational motion after the device is fitted and after the above described positioning adjustment has been completed, by the fastening force of the nut 36h when fully tightened, which longitudinally compresses said eccentric collar 36f.

Figure 12:
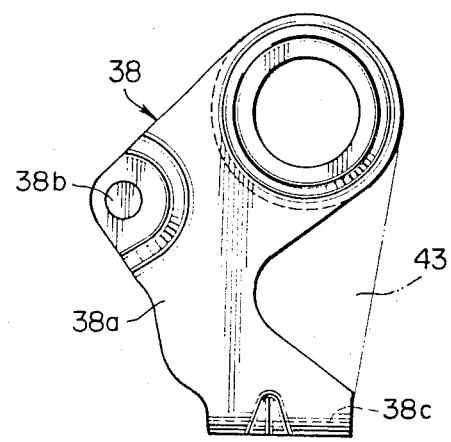
FIG. 12 is an end on view of a connecting lever which connects the first and the third levers, shown in FIGS. 6 and 10, of the first and second tilt locking mechanisms.
Figure 13:
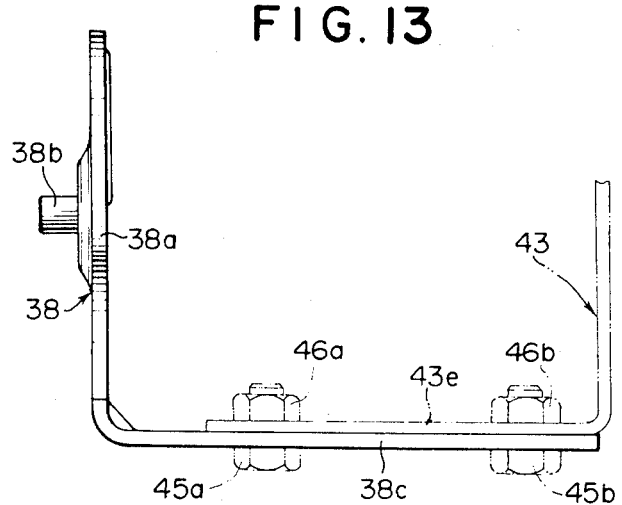
FIG. 13 is a side view of said connecting laver of FIG. 12.

The first release lever 33 of the first tilt locking mechanism 30 and the third release lever 43 of the second tilt locking mechanism 40 are connected together by a connecting member 38, which is shown in end on view in FIG. 12 and in side view in FIG. 13. This connecting member 38 is a lever which is bent into an L-shape, and a plate portion 38a thereof is rotatably fitted onto the mounting bolt 36b between the cover plate 34 and the second release lever 35. A connection pin 38b, provided on said plate portion 38a, is fitted into a combination aperture 33e formed in the first release lever 33, while an arm portion 43e formed on the third release lever 43 and extending from the lower end thereof generally at right angles thereto in the leftward direction as seen in FIG. 13 is coupled, in this embodiment of the present invention by bolts 45a and 45b and nuts 46a and 46b threadingly fitted on said bolts 45a and 45b, to an arm portion 38c extending from the lower end of the plate portion 38a of the connecting member 38 generally at right angles thereto in the rightward direction as seen in FIG. 13. In detail, the nuts 46a and 46b are welded onto the upper surface in FIG. 13 of the arm portion 43e of the third release lever 43, and correspond to holes formed in the arm portion 38c of the connecting member 38, and then, after the assembly has been put together and said arm portion 38c of the connecting member 38 is lying against the arm portion 43e of the third release lever 43, the bolts 45a and 45b are passed through said holes in said arm portion 38c and are threaded into and tightened into said nuts 46a and 46b, thus clamping together said arm portion 43e of the third release lever 43 and said arm portion 38c of the connecting member 38 and preventing any mutual motion thereof. Thus, the first release lever 33 and the third release lever 43 are rotationally connected together, so that the rotational operation of the first release lever 33 causes the rotation of the connection member 38 which in turn causes the rotation of the third release lever 43.

However, particularly according to a feature of the present construction, as can best be seen in FIG. 6, the connection aperture 33e formed in the first release lever 33 is shaped as a somewhat elongated circular arc with center the center of rotation of said first release lever 33, and the connection pin 38b of the connection member 38 fits into this connection aperture 33e with a certain amount of free play remaining in the circumferential direction. In other words, the aforesaid rotational coupling together of the first release lever 33 of the first tilt locking mechanism 30 and the third release lever 43 of the second tilt locking mechanism 40 is provided, only with a certain amount of rotational play therebetween.

In the first and third release levers 33 and 43, the cam grooves 33d and 43d respectively provided are formed in an asymmetric manner, and there is a certain time lag in the meshing and the release of meshing of the pawls 32 and 42 with their respective ratchets 31 and 41. The cam groove 33d of the first release lever 33 (vide FIG. 6) is formed with an arcuate portion 33d1 at its proximal end portion the center of which is the central axis of the mounting bolt 36b, and with a cam portion 33d2 at its free end portion. On the other hand, the cam groove 43d of the third release lever 43 is formed with a cam portion 43d1 at its proximal end portion and with an arcuate portion 43d2 at its free end portion the center of which is the central axis of the mounting bolt 44a. Thus, when the first and the third release levers 33 and 43 rotate, the pressures of the rollers 33c and 43c on the pawls 32 and 42 respectively actuated thereby are released at the same time, but, thereafter, the pawl 42 is displaced from the ratchet 41 to be disengaged therefrom first and then subsequently the pawl 32 is displaced from the ratchet 31 to be disengaged therefrom. And, when the two pawls 32 and 42 mesh with their respective ratchets 31 and 41, the pawl 32 has a priority.

The lock mechanism 26 for selectably preventing the sliding of the upper tube 21 in the rotatable bracket 25 will not be particularly described with regard to its structure, because it is not directly relevant to the concept of the present invention; suffice it to say that said lock mechanism is selectably actuated by the driver by the operation of the operating lever 26a.

The relevant portions of the operation of this tilt steering device as described above will now be explained.

In the condition that the driver does not operate the first release lever 33 of the first tilt locking mechanism 30, then the rotatable bracket 25 is locked to the main fixing bracket 23 by means of the two tilt locking mechanisms 30 and 40. In this state of the apparatus, the first tilt locking mechanism 30 is in its state as shown in FIG. 3, with its pawl 32 engaged with its ratchet 31; and the second tilt locking mechanism 40 is also in a similar state, mutatis mutandis, with its pawl 42 engaged with its ratchet 41, and with its third release lever 43 in a like position to that of the first release lever 33.

When the hand of the driver, from this locked state, is applied to the end of the first release lever 33 of the first tilt locking mechanism 30 so as to rotate said first release lever 33 in the counterclockwise direction as seen in FIG. 3, then the connection member 38 and the third release lever 43 of the second tilt locking mechanism 40 are rotated in the same direction, albeit with a relatively slight and basically insignificant at this time delay due to the provision of the elongated shape for the connection aperture 33e as explained above. As a result, the pressures exerted on the pawls 32 and 42 respectively by the rollers 33c and 43c provided on the first and third release levers 33 and 43 respectively of the first and second tilt locking mechanisms 30 and 40 are released substantially at the same time, but, because of the difference in the forms and the actions of the cam grooves 33d and 43d, the pawl 42 of the second tilt locking mechanism 40 is displaced from its ratchet 41 first to release said second tilt locking mechanism 40, and only subsequently is the pawl 32 of the first tilt locking mechanism 30 displaced from its ratchet 31 to release said first tilt locking mechanism 30. This effect, of first releasing that one of the tilt locking mechanisms which is displaced sideways from the first release lever 33 which is being manually operated, is done in order to prevent the type of twisting of the mechanism that might occur if the reverse condition were to prevail. When the locking of the rotatable bracket 25 to the main fixing bracket 23 by the two tilt locking mechanisms 30 and 40 has been thus released, then by the actions of the tension coil springs 27a and 27b the rotatable bracket 25 as well as the upper tube 21, the upper shaft assembly 10a, and the steering wheel W are lifted up (possibly with some slight manual assist by the vehicle driver), and the position of the elements of the first tilt locking mechanism 30 becomes as shown in FIG. 4.

The inner teeth 34d of the arcuate portion 34b of the cover plate 34, in this situation of the first tilt locking mechanism 30, are still meshed with the same ones of the teeth 31a of the ratchet 31 with which they were previously meshed, not having moved with respect thereto, and the pawl 32 has raised up from those of the teeth 31a of said ratchet 31 with which it was previously meshed, and is now confronting the smooth outside surface of said arcuate portion 34b of said cover plate 34. Therefore, when from this position of the apparatus the driver simply pushes downwards on the steering wheel W (without actuating any control lever), the pawl 32 which was being pressed by the roller 33c now slides over the smooth outside surface of said arcuate portion 34b of said cover plate 34, until it reaches those of the teeth 31a of said ratchet 31 with which it was previously meshed, and then it snaps downwards thereagainst and locks to those particularly teeth again. And, at this time, in the second tilt locking mechanism 40, the roller 43c presses the pawl 42, but, before the meshing of the ratchet 31 and the pawl 32 of the first tilt locking mechanism 30 has occurred as described above, the ratchet 41 and the pawl 42 of said second tilt locking mechanism 40 are still displaced from one another by the action of the engagement pin 42 and the cam groove 43d as explained above, and the pawl 42 and the ratchet 41 mesh together only substantially immediately after the meshing of the ratchet 31 and the pawl 32 of the first tilt locking mechanism 30. Thus, this tilt locking system is equipped with a so called memory function, and as a result the steering wheel is always returned to the set initial position, as described above.

The way in which this memorized position of the steering wheel W may be adjusted will now be explained. In this case, from the state of the members of the first tilt locking mechanism shown in FIG. 3, the second release lever 35 is rotationally moved by the vehicle operator in the anticlockwise direction as seen in the figure. As a result, the cover plate 34 is slidably moved to the left as seen in FIG. 3 by the action of the engagement pin 34f and the cam groove 35c of the second release lever 35, and its cover portion 34b is displaced from the ratchet 31 with its teeth 34d becoming disengaged from the ratchet teeth 31a, while the projection 34c of the cover plate 34 enters the engagement depression 37a of the guide plate 37. Therefore, the cover plate 34 now can be rotated with respect to the ratchet 31. And, when the second release lever 35 is further rotationally operated, the engagement pin 35d provided on said second release lever 35 is engaged with the first release lever 33 so as to integrally rotate it. As a result, the third release lever 43 of the second tilt locking mechanism 40 is simultaneously rotated by way of the connection member 38, and, as shown in FIG. 5, the locking of the fixed bracket 23 to the rotational bracket 25 by the two tilt locking mechanisms 30 and 40 is released. Therefore, the steering wheel W may be moved vertically, either upwards or downwards, while the second release lever 35 is retained at its rotational position. And, after the steering wheel W has been vertically adjusted to its desired position, the releasing of the operation of the second release lever 35 causes the rotational restoration of the first and the third release levers 33 and 43, thereby causing the pawls 32 and 42 to now mesh with portions of the arcuate teeth portions 31a and 41a of their ratchets 31 and 41 which are different from the positions with which they were previously meshed. Thereafter, the second release lever 35 rotationally restores itself, and returns the cover plate 34 back to its non operational position so as to now make its teeth portion 34d mesh with and cover a portion of the arcuate teeth portion 31a of the ratchet 31 which is different from the previously meshed with and covered portion. In this case, the teeth portion 34d of the cover plate 34 meshes with a teeth portion 31a of the ratchet 31 which is angularly displaced from the previous teeth portion which was meshed with the opposing member prior to the positional adjustment of the steering wheel W, just by the angle through which the steering wheel W has been adjusted, and the newly adjusted position of the steering wheel W is thus memorized.

According to the shown construction, therefore, the upper tube 20 and the upper steering shaft assembly 10a and the steering wheel W mounted thereon can be supported on the two sides of the main fixing bracket 23 which is fixedly secured with respect to the lower tube 22, by means of the two tilt locking mechanisms 30 and 40 the operation of which is linked together as explained above. Therefore, it has become possible to obtain very good vibrational characteristics of the entire construction, by increasing the rigidity of the locking support of the upper tube 21 and its associated members. In this shown construction, since the first and the third release levers 33 and 43 are connected together for synchronization by the connecting member 38, the operability of the first and second tilt locking mechanisms 30 and 40 is quite favorable.

Further, since the coupling mechanism between the first and the third release levers 33 and 43 of the first and second tilt locking mechanisms 30 and 40 is provided by the connecting member 38, by the protruding extension portions 38c and 43e of said connecting member 38 and said third release lever 43, and by the fixing means including the bolts 45a and 45b and the nuts 46a and 46b which functions as a means for coupling said connecting member 38 and said third release lever 43 together after the rest of the construction has been assembled in the mutual relative abutting position that said connecting member 38 and said third release lever 43 fall into at that time, lying together under the column tube assembly in an overlapping state, thereby the assemblability of the construction is very excellent, and no trouble at all need be experienced during the assembly process.

According to a particular feature of the shown construction, since a small amount of play is provided in the coupling between the first release lever 33 of the first tilt locking mechanism 30 and the coupling member 38 by, in this first preferred embodiment, forming the connection aperture 33e in the first release lever 33 as shaped as a somewhat elongated circular arc with center the center of rotation of said first release lever 33, and by arranging the fit of the connection pin 38b of the connection member 38 into this connection aperture 33e to have a certain amount of free play remaining in the circumferential direction, thereby when fitting together the two tilt locking mechanisms 30 and 40 and the steering column assembly as a whole, there is a certain degree of freedom available between these two tilt locking mechanisms 30 and 40, and this degree of freedom absorbs any misalignment which might otherwise deteriorate the meshing state of the pawls 32 and 42 with the ratchets 31 and 41 which may have arisen due to manufacturing variations of the structural elements of said two tilt locking mechanisms. Thus, it is possible to ensure that the pawls 32 and 42 engage properly and positively with their ratchets 31 and 41 at all times, without any problems arising with precise alignment of the components of the two tilt locking mechanisms 30 and 40 during assembly of the construction.

Figure 15:
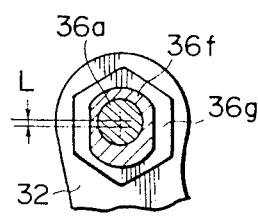
FIG. 15 is a transverse sectional view of said adjustable construction, as taken in a plane shown by the arrows XV—XV in FIG. 14.
Figure 14:
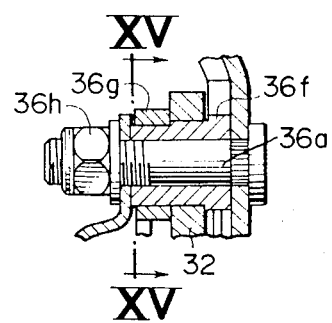
FIG. 14 is a longitudinal sectional view of an adjustable construction for rotatably mounting a pawl of said first tilt locking mechanism to a fixed member.

Since in this construction the pawl 32 of the first tilt locking mechanism 30 is assembled to the device by the use of the eccentric pivoting means incorporating the mounting bolt 36a, the eccentric collar 36f, the spacer 36g, and the fastening nut 36h and so on, as shown in FIGS. 14 and 15 in detail, thereby as explained above by turning the eccentric collar 36f and the spacer 36f integrally fitted therewith in assembling the pawl 32 to the first tilt locking mechanism 30, the swing center of the pawl 32 can be adjusted to a desired position within a certain range, and thus the meshing state between said pawl 32 and its ratchet 31 can be adjusted. Therefore, according to this construction, by first assembling the pawl 42 of the second tilt locking mechanism 40 and, after meshing said pawl 42 with its ratchet 41, subsequently assembling the pawl 32 of the first tilt locking mechanism 30 with its swing center properly adjusted as described above, the meshing states of the pawls 32 and 42 relative to the ratchets 31 and 41 respectively can be set correctly, irrespective of the inevitable manufacturing errors and assembling errors of the various components of the two tilt mechanisms 30 and 40. And this proper setting of the meshing states of the pawls 32 and 42 relative to the ratchets 31 and 41 respectively is very materially aided by the provision of the certain degree of play as explained above between the first release lever 33 of the first tilt locking mechanism 30 and the coupling member 38.

The present invention is not to be considered as limited in its application to the type of steering device shown above, although that is its most preferred application. Various other possibilities are also conceivable. For example, it would be possible to apply the construction, explained above, of providing a small amount of play in the rotational direction between the first release lever 33 of the first tilt locking mechanism 30 and the coupling member 38, for instead providing a small amount of play in the rotational direction between the coupling member 38 and the second release lever 43 of the second tilt locking mechanism 40, thus allowing a very small but non zero relative movement amount between said coupling member 38 and said second release lever 43 of said second tilt locking mechanism 40. This would perform the same function of absorbing the inevitable manufacturing errors present in the various parts of the construction and allowing smooth operation. Alternatively, it would be possible to construct the tilt locking mechanisms 30 and 40 in the reverse manner to that shown, with the ratchets 31 and 41 instead assembled to the main fixing bracket 32, and with the pawls 32 and 42 rotatably mounted to the rotatable bracket 25. In either case, it will be clear to one of ordinary skill in the art, based upon the descriptions contained in this specification, that the same advantages as accrued in the case of the first preferred embodiment of the present invention described above will be available.

The present invention can also be applied to a tilt steering column of a type disclosed in Japanese Utility Model Publication Ser. No. 57-53730 (1982) applied for by the assignee or entity owed duty of assignment of the present patent application. This type of steering column may be provided with a memory function and/or a telescopic function. For applying this invention to a tilt steering column in which the upper steering column tube is directly pivoted to the lower steering column tube, the ratchet or ratchets may be assembled to either one of the tubes, and the pawl or pawls may be assembled to the other one of the tubes. Therefore, although the present invention has been shown and described in terms of certain preferred embodiments thereof, and with reference to the appended drawings, it should not be considered as being particularly limited thereby. The details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the legitimate and properly interpreted scope of the accompanying claims, which follow.

What is claimed is:

1. A tiltable steering column for an automotive vehicle, comprising:
(a) a main steering shaft comprising a lower steering shaft and an upper steering shaft tiltably rotationally connected to said lower steering shaft;
(b) a column tube assembly, comprising:
   (b1) a lower tube structure which rotatably supports said lower steering shaft from a body of said automotive vehicle; and
   (b2) an upper tube structure which rotatably supports said upper steering shaft and is pivotally mounted so as to be able to tilt relative to said lower tube structure about a tilting axis;
   (b3) a first pivot pin and a second pivot pin arranged along said tilting axis on a first side and a second side opposite to said first side of said column tube assembly, respectively, for tiltably connecting said upper tube structure with said lower tube structure; and
(c) a tilt locking mechanism, comprising a first side ratchet mechanism on said first side of said column tube assembly and a second side ratchet mechanism on said second side of said column tube assembly, said first and second side ratchet mechanisms respectively comprising:
(c1) a first and a second ratchet each fixedly attached to one of said upper tube structure and said lower tube structure;
(c2) a first and a second pawl each pivotally attached to the other of said upper tube structure and said lower tube structure;
(c3) a means for continuously biasing said first and said second pawl so as to engage them respectively with said first and said second ratchet; and
(c4) a first and a second pawl releasing means respectively mounted to be rotatable about said first and said second pivot pin for selectively biasing said first and said second pawl so as to release said respective engagement thereof with said first and said second ratchet;
and further comprising:
(d) a means for coupling operation of said first and said second pawl releasing means together, comprising an L-shaped member having a first leg portion mounted on said first pivot pin so as to be rotatable therearound and torque-transmittingly engaged with said first pawl releasing means so as rotationally to drive said first pawl releasing means around said first pivot pin for releasing said first pawl from the engagement with said first ratchet and a second leg portion extending from said first leg portion thereof sidewardly from said first side of said column tube assembly toward said second side of said column tube assembly, and a means for fastening said second leg portion of said L-shaped member with said second pawl releasing means.

2. A tiltable steering column according to claim 1, wherein said second pawl releasing means comprises a portion extending sidewardly from said second side of said column tube assembly toward said first side of said column tube assembly so as to overlap with said second leg portion of said L-shaped member, said overlapped portions being fastened by bolts and nuts.

3. A tiltable steering column according to claim 1, wherein said first leg portion of said L-shaped member carries a pin projection extending substantially in parallel with said first and second pivot pins, and said first pawl releasing means is formed with an opening adapted to receive said pin projection so as to be engaged with said L-shaped member to transmit a torque therebetween around said first pivot pin.

* * * * *